US010994243B2

(12) United States Patent
Kitabata et al.

(10) Patent No.: US 10,994,243 B2
(45) Date of Patent: May 4, 2021

(54) CARBON MEMBRANE FOR FLUID SEPARATION AND CARBON MEMBRANE MODULE FOR FLUID SEPARATION

(71) Applicant: Toray Industries, Inc., Tokyo (JP)

(72) Inventors: Masahiro Kitabata, Otsu (JP); Kosaku Takeuchi, Otsu (JP); Takaaki Mihara, Otsu (JP); Tomoyuki Horiguchi, Otsu (JP)

(73) Assignee: Toray Industries, Inc.

( * ) Notice: Subject to any disclaimer, the term of this patent is extended or adjusted under 35 U.S.C. 154(b) by 308 days.

(21) Appl. No.: 16/071,183

(22) PCT Filed: Jan. 17, 2017

(86) PCT No.: PCT/JP2017/001416
§ 371 (c)(1),
(2) Date: Jul. 19, 2018

(87) PCT Pub. No.: WO2017/126504
PCT Pub. Date: Jul. 27, 2017

(65) Prior Publication Data
US 2019/0176082 A1    Jun. 13, 2019

(30) Foreign Application Priority Data

Jan. 22, 2016  (JP) .............................. JP2016-010451

(51) Int. Cl.
*B01D 53/22*      (2006.01)
*C01B 32/05*      (2017.01)
(Continued)

(52) U.S. Cl.
CPC ........... *B01D 53/228* (2013.01); *B01D 53/22* (2013.01); *B01D 69/00* (2013.01); *B01D 69/082* (2013.01);
(Continued)

(58) Field of Classification Search
CPC .. B01D 69/00; B01D 2325/02; B01D 71/021; B01D 2325/06; B01D 53/22;
(Continued)

(56) References Cited

U.S. PATENT DOCUMENTS

| 4,690,873 A |   | 9/1987 | Makino et al. |
| 5,514,428 A | * | 5/1996 | Kunert ...................... B32B 5/24 |
|             |   |        | 428/34 |

(Continued)

FOREIGN PATENT DOCUMENTS

| CN | 202179933 U | 4/2012 |
| CN | 102574068 A | 7/2012 |

(Continued)

OTHER PUBLICATIONS

Linkov "Carbon membranes from precursors containing low-carbon residual polymers" Polymer International 35, 1994, 239-242 (Year: 1994).*

(Continued)

*Primary Examiner* — Anthony R Shumate
(74) *Attorney, Agent, or Firm* — RatnerPrestia

(57) ABSTRACT

A carbon membrane for fluid separation, i.e., a fiber-form carbon membrane for fluid separation, has protrusions having a height difference of at least 1 μm formed on the fiber surface. In the carbon membrane for fluid separation, adhesion between membranes is inhibited and clogging tends not to occur when a gas mixture containing water vapor is separated. A carbon membrane module for fluid separation that includes the fibrous carbon membrane for fluid separation is also disclosed.

22 Claims, 3 Drawing Sheets

(51) Int. Cl.
  *B01D 69/00* (2006.01)
  *B01D 71/02* (2006.01)
  *D01F 9/22* (2006.01)
  *B01D 69/08* (2006.01)
  *B01D 67/00* (2006.01)
(52) U.S. Cl.
  CPC .......... *B01D 69/087* (2013.01); *B01D 71/02* (2013.01); *B01D 71/021* (2013.01); *C01B 32/05* (2017.08); *D01F 9/22* (2013.01); *B01D 67/0067* (2013.01); *B01D 2325/02* (2013.01); *B01D 2325/06* (2013.01)
(58) Field of Classification Search
  CPC .................. B01D 53/228; B01D 67/0067; B01D 69/087; B01D 71/02; B01D 69/082; D01F 9/22; C01B 32/05
  See application file for complete search history.

(56) References Cited

U.S. PATENT DOCUMENTS

| | | | |
|---|---|---|---|
| 7,074,105 B2* | 7/2006 | Kawate | B01J 23/44 445/50 |
| 2006/0204833 A1* | 9/2006 | Nomi | H01M 4/8605 429/413 |
| 2010/0160466 A1* | 6/2010 | Elabd | B01D 67/0006 521/27 |
| 2010/0243168 A1* | 9/2010 | Nakano | H01L 21/67742 156/345.54 |
| 2012/0125850 A1 | 5/2012 | Fujimura et al. | |
| 2013/0051535 A1* | 2/2013 | Davis | H01J 35/18 378/161 |
| 2015/0005434 A1* | 1/2015 | Miyoshi | C08J 5/042 524/495 |
| 2015/0061320 A1* | 3/2015 | Yabu | B62D 25/082 296/187.1 |
| 2015/0174809 A1 | 6/2015 | Fujimura et al. | |
| 2017/0028689 A1* | 2/2017 | Verpoest | B32B 27/12 |
| 2017/0143059 A1* | 5/2017 | Gallagher | A43B 23/07 |
| 2017/0216779 A1* | 8/2017 | Takeuchi | B01D 67/0067 |
| 2019/0054707 A1* | 2/2019 | Miyoshi | B29C 70/14 |
| 2019/0070827 A1* | 3/2019 | Yoshikawa | G03B 9/36 |
| 2019/0118493 A1* | 4/2019 | Matsumoto | B29C 70/342 |

FOREIGN PATENT DOCUMENTS

| | | |
|---|---|---|
| CN | 202671248 U | 1/2013 |
| CN | 102160969 B | 7/2013 |
| JP | 5747202 U | 3/1982 |
| JP | 59062304 A | 4/1984 |
| JP | 61133118 A | 6/1986 |
| JP | 62225206 A | 10/1987 |
| JP | 04082920 A | 3/1992 |
| JP | 05220360 A | 8/1993 |
| JP | 07089714 A | 4/1995 |
| JP | 07171360 | 7/1995 |
| JP | 10052629 A | 2/1998 |
| JP | 2003286018 A | 10/2003 |
| JP | 2012040464 A | 3/2012 |
| JP | 2012236155 A | 12/2012 |
| JP | 2015016400 A | 1/2015 |
| WO | 0050675 A1 | 8/2000 |

OTHER PUBLICATIONS

Taiwan Office Action for Taiwan Application No. 106101798, dated Feb. 17, 2020 with Search Report, 5 pages.
Fong et al., "Beaded Nanofibers Formed During Electrospinning", Polymer, vol. 40, 1999, pp. 4585-4592.
Yang et al. "Preparation of PAN Spinning Solution with Fine Dispersion of Cellulose Microparticles", Advances in Materials Science and Engineering, vol. 2015, 2015, 9 pages.
Yoshimune et al., "$CO_2/CH_4$ Mixed Gas Separation Using Carbon Hollow Fiber Membranes", Energy Procedia, vol. 37, 2013, pp. 1109-1116.
Extended European Search Report for European Application No. 17741382.0, dated Oct. 1, 2019, 10 pages.
International Search Report and Written Opinion for International Application No. PCT/JP2017/001416, dated Apr. 18, 2017, 7 pages.
Chinese Office Action for Chinese Application No. 201780007257.1, dated May 28, 2020, with translation, 15 pages.
Indonesian Substantive Examination Report for Indonesian Application No. PID201805447, dated Mar. 18, 2020, with translation, 4 pages.

* cited by examiner

CARBON MEMBRANE FOR FLUID SEPARATION AND CARBON MEMBRANE MODULE FOR FLUID SEPARATION

CROSS REFERENCE TO RELATED APPLICATIONS

This is the U.S. National Phase application of PCT/JP2017/001416, filed Jan. 17, 2017, which claims priority to Japanese Patent Application No. 2016-010451, filed Jan. 22, 2016, the disclosures of these applications being incorporated herein by reference in their entireties for all purposes.

TECHNICAL FIELD OF THE INVENTION

The present invention relates to a carbon membrane for fluid separation and a carbon membrane module for fluid separation.

BACKGROUND OF THE INVENTION

A membrane separation method has been known as a fluid separation method for selectively separating and purifying a specified fluid component from a fluid mixture. The membrane separation method attracts attention because it works in an energy-saving manner as compared with other fluid separation methods.

As a raw material of a separation membrane for use in fluid separation, particularly gas separation, organic membranes, such as a polyimide membrane, have been proposed, but such organic membranes have a problem in that these membranes are poor in heat resistance or chemical resistance (for example Patent Document 1).

Meanwhile, it has been reported to use a zeolite, which has excellent heat resistance, in a separation membrane. However, zeolite membranes have poor acid resistance. In addition, since it is difficult to form the zeolite used alone into a desired shape, it has been necessary to form a membrane thereof on a porous support. Moreover, there has also been a problem in that the steps for producing the membrane are complicated and costly (for example, Patent Document 2).

In order to solve such problems, membrane separation using a carbon membrane for fluid separation is attracting attention. The carbon membranes for fluid separation show excellent gas-separating performance and are usable even in environments where heat resistance and chemical resistance are required, and are hence expected to be put to practical use.

As the carbon membrane for fluid separation, for example, a carbon membrane obtained by applying a resin such as a phenolic resin or polyimide to the surface of a hollow porous ceramic body and carbonizing the resin in a non-oxidizing atmosphere, has been reported (for example, Patent Document 3 or 4). However, the steps for producing such a carbon membrane are complicated, and the carbon membrane has been expensive.

A report has been made also on a hollow fiber carbon membrane as a self-supporting carbon membrane for fluid separation (for example, Patent Document 5). Hollow fiber carbon membranes can be produced at low cost by relatively simple production steps and can be made to have a large membrane area per unit volume. Therefore, these hollow fiber carbon membranes have an advantage in that a compact separation membrane module can be fabricated therefrom as compared with flat membranes.

Common problems in membrane separation using various raw materials include a problem that the flow of fluid is hampered due to adherence of membranes, resulting in deterioration of the separation performance. In order to solve the problem, it is reported that irregularities are given to the surfaces of separation membranes to make the surfaces with modified cross-sections so that the adherence of the membranes can be improved (for example, Patent Document 6 or 7). However, carbon membranes for fluid separation often have defects in projections due to their brittleness when they are formed into a module. It has been therefore known that it is difficult to provide the carbon membranes for fluid separation with modified sections.

By the way, it has been studied that a membrane separation process is applied to a separation technique of carbon dioxide as impurity in nitrogen discharged from a power plant or a separation technique of carbon dioxide in order to improve purity of methane gas or prevent a pipeline from corroding in a natural gas refining plant. For example, Patent Document 8 reports that carbon dioxide can be separated highly efficiently even in presence of water vapor by a separation membrane in which a water-repellent coating layer is provided on a surface of zeolite.

PATENT DOCUMENTS

Patent Document 1: JP-A-61-133118
Patent Document 2: JP-A-7-089714
Patent Document 3: JP-A-10-52629
Patent Document 4: JP-A-2003-286018
Patent Document 5: JP-A-5-220360
Patent Document 6: JP-A-62-225206
Patent Document 7: JP-A-7-171360
Patent Document 8: JP-A-2012-236155

SUMMARY OF THE INVENTION

In carbon membranes for fluid separation, there was also a problem that the separation performance deteriorates due to adherence of the membranes, in the same manner as organic membranes or zeolite membranes. In addition, in the gas separation/refining process in the power plant or the natural gas plant, a mixed gas which has not been separated yet contains water vapor. Thus, the water vapor may be condensed into liquid water, causing clogging of the membranes. As a result, there is another problem that the gas permeation rate of carbon dioxide is drastically decreased, and consequently, the separation factor is drastically lowered.

The present invention has been developed in consideration of the aforementioned conventional situation. The problem the present invention is to solve is to provide a carbon membrane for fluid separation in which adherence of the membranes is prevented, and clogging is hard to occur in separation of a mixed gas containing water vapor.

As a result of diligent studies, the present inventors found that the above problem can be solved by a carbon membrane for fluid separation which is a fibrous carbon membrane for fluid separation, and in which projections having a height difference of 1 µm or more are formed on a surface of the fiber, and completed the present invention.

The present invention relates to the following <1> to <12>.

<1> A carbon membrane for fluid separation which is a fibrous carbon membrane for fluid separation, in which projections having a height difference of 1 µm or more are formed on a surface of fiber.

<2> The carbon membrane for fluid separation according to <1>, which is a fibrous carbon membrane for fluid separation, comprising a core layer having a co-continuous porous structure, and a skin layer formed around the core layer and substantially having no co-continuous porous structure.

<3> The carbon membrane for fluid separation according to <1> or <2>, in which a core layer ratio in a projection cross-section of the projection is 50% or more and 98% or less.

<4> The carbon membrane for fluid separation according to any one of <1> through <3>, which separates mixed gases.

<5> The carbon membrane for fluid separation according to any one of <1> through <4>, in which a height of the projection is ½ or less of a radius of an inscribed circle which inscribes in an outer edge of a cross-section of fiber.

<6> The carbon membrane for fluid separation according to any one of <1> through <5>, in which the projection is a ridge-like protrusion extending 100 μm or more in length in an axial direction of the fiber.

<7> The carbon membrane for fluid separation according to <6>, in which the ridge-like protrusion extends along whole length of the carbon membrane for fluid separation.

<8> The carbon membrane for fluid separation according to <6> or <7>, in which a plurality ° of the ridge-like protrusions are formed on a surface of the fiber.

<9> The carbon membrane for fluid separation according to <8>, in which the ridge-like protrusions are formed radially in a cross-section of the fiber.

<10> The carbon membrane for fluid separation according to <9>, in which an average formation interval of the ridge-like protrusions is ⅓ or more and 4 times or less of an average width of the ridge-like protrusions.

<11> The carbon membrane for fluid separation according to any one of <6> through <10>, in which the average width of the ridge-like protrusions is 1 μm or more and 100 μm or less.

<12> A carbon membrane module for fluid separation, comprising the carbon membrane for fluid separation according to any one of <1> through <11>.

According to the present invention, it is possible to provide a carbon membrane for fluid separation, particularly a carbon membrane for fluid separation useful in gas separation of carbon dioxide, in which adherence of the membranes is prevented, and a high separation factor can be obtained in separation of mixed gas containing water vapor.

DETAILED DESCRIPTION OF EMBODIMENTS OF THE INVENTION

<Carbon Membrane for Fluid Separation>

A carbon membrane for fluid separation (hereinafter also referred to simply as "carbon membrane") of the present invention has a fibrous form in which projections having a height difference of 1 μm or more are formed on the surface of fiber.

The fibrous form means a form having an average length at least 100 times as long as an average diameter. Fibrous carbon membranes can be advantageously made into a gas separation membrane module in which the carbon membranes are built in, so that the membrane area per unit volume can be increased as compared with that of film-like ones.

For the carbon membrane for fluid separation of the present invention, a fibrous carbon membrane for fluid separation, which includes a core layer having a co-continuous porous structure, and a skin layer formed around the core layer and substantially having no co-continuous porous structure, is particularly preferred.

Fluid to be separated by the carbon membrane for fluid separation of the present invention is a mixture of at least two kinds of fluids, and preferably a mixture of at least two kinds of gases. The mixture of gases does not have to be a mixture of pure gases, and may contain a small amount of impurities. The impurities are not particularly limited, and they may include not only gas such as water vapor but also liquid or solid such as water, sand or oil. Gas components are not particularly limited, as long as they are gaseous molecules with which selective permeability can be obtained by the molecular sieve effect of the carbon membrane. Examples of such gaseous molecules that are often used in carbon membrane separation include carbon dioxide, methane, ethane, ammonia, nitrogen, hydrogen chloride, hydrogen, and oxygen.

Figure 1:
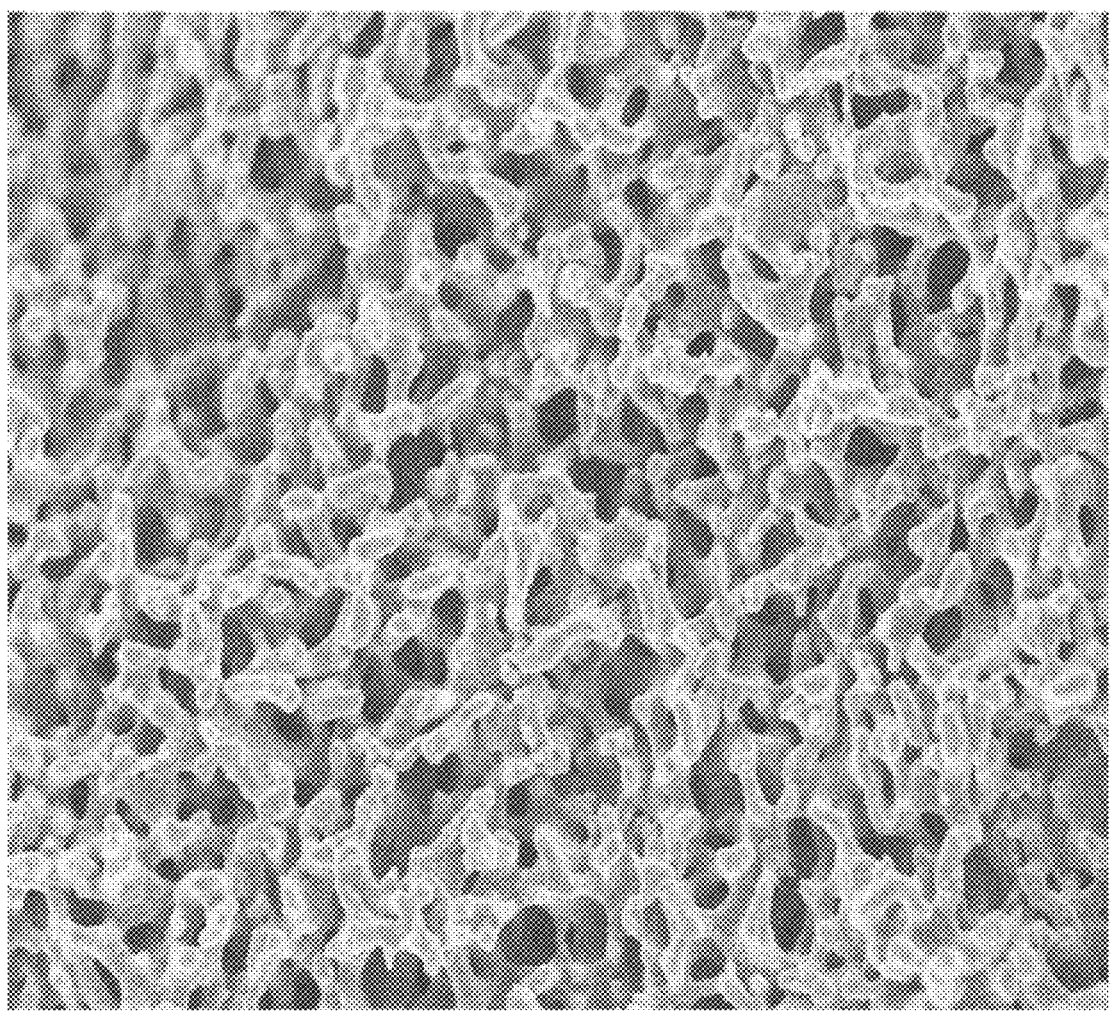
FIG. 1 is a scanning electron microscopic photograph of the core layer of the carbon membrane for fluid separation produced in Example 1.

The core layer is a layer having a co-continuous porous structure and formed inside the skin layer, which will be described later, and is a layer constitutes the center of the carbon membrane for fluid separation of the present invention. The "co-continuous porous structure" means a structure in which branches (carbon parts) and pores (voids) are respectively interconnected and regularly intertwined with each other three-dimensionally. Specifically, as illustrated in FIG. 1 by way of example, the co-continuous porous structure means that when a specimen which has been sufficiently cooled in liquid nitrogen is cut with tweezers or the like and the cut surface is examined with a scanning electron microscope, then a structure in which branches and voids are respectively interconnected inward is observed.

This structure possessed by the core layer produces an effect in which the branches support one another to maintain the structure, and stress is dispersed throughout the whole membrane. Consequently, the carbon membrane can have high resistance to external forces such as compression and bending and have further improved pressure resistance.

Generally, in the case of resinous hollow-fiber membranes used for membrane separation, the kinds of the inner structures thereof are classified into the closed-cell type in which pores do not communicate with one another, and the continuous porous structure type in which pores communicate with one another. When the classification is applied to the core layer of the carbon membrane for fluid separation of the present invention, it is classified to the continuous porous structure type. Further, as will be described later, the core layer includes a co-continuous porous structure with high uniformity such that X-ray scattering can be observed therein. Because of this, the carbon membrane for fluid separation has enhanced pressure resistance and can be used without being damaged even when a gas having a high pressure is supplied thereto.

It is preferred that the co-continuous porous structure of the core layer has a structural period of 0.002 µm to 10 µm. When the structural period in the core layer is 0.002 µm or more, the pressure loss which occurs when a gas is passed through the voids is low and the flow rate can be heightened. In addition, a decrease in the pressure loss has the effect of rendering more energy-saving separation and purification possible. The structural period thereof is more preferably 0.01 µm or more, and even more preferably 0.05 µm or more.

Meanwhile, when the structural period thereof is 10 µm or less, the carbon membrane is more resistant to forces applied in cross-sectional directions, such as compression and bending, and can hence have improved pressure resistance. The structural period thereof is more preferably 8 µm or less.

The structural period of the co-continuous porous structure of the core layer is calculated using the following equation from the scattering angle 2θ corresponding to the position of a peak top regarding the intensity of scattered light resulting from small-angle scattering when the carbon membrane for fluid separation of the present invention is irradiated with X-rays.

$$L = \frac{\lambda}{2\sin\theta}$$ [Equation 1]

L: structural period (µm), λ: wavelength of incident X-rays (µm)

It is, however, noted that there are cases where the structural period of the core layer is so large that small-angle scattering cannot be observed. In that case, the structural period is obtained by X-ray computerized tomography (X-ray CT). Specifically, three-dimensional images taken by the X-ray CT is subjected to Fourier transformation, and the resultant two-dimensional spectrum is processed by circular averaging to obtain a one-dimensional spectrum. The characteristic wavelength corresponding to the position of a peak top in the one-dimensional spectrum is determined, and the structural period of the core layer is calculated as the inverse of the obtained characteristic wavelength.

In the analysis for structural period described above, the skin layer, which will be described later, exerts no influence on the analysis because the structural period thereof is outside the range, and the structural period calculated with the above-mentioned equation is taken as the structural period of the co-continuous porous structure of the core layer.

It is preferred that a central part of the core layer has an average porosity of 10% to 80%. The average porosity is a value calculated by obtaining a precise cross-section of an embedded specimen by the cross-section polisher method (CP method), examining the cross-section at a magnification regulated so as to result in 1±0.1 (nm/pixel) and at a resolution of 700,000 pixels or higher, setting in the resultant image a square examination region for calculation in which each side has 512 pixels, calculating a porosity using the following equation, in which C is the sectional area of the carbon membrane and D is the area of the pores, and calculating an arithmetic average for any 20 sites within the cross-section.

Average porosity (%)=$D/C$×100

The higher the average porosity thereof, the lower the pressure loss and the more the flow velocity can be heightened when the core layer is used as a channel for gases or liquids. Meanwhile, the lower the average porosity thereof, the higher the resistance to forces applied in cross-sectional directions, such as compression and bending, and hence the more the carbon membrane is advantageous in terms of handleability and use under high pressure. Consequently, the average porosity is more preferably 15% or more, and even more preferably 18% or more. Meanwhile, the lower the average porosity thereof, the more the pressure resistance is improved and the more the carbon membrane can be used under high-pressure conditions. Consequently, the average porosity is more preferably 75% or less, and even more preferably 70% or less.

Incidentally, the above central part of the core layer means a gravity center when assuming that a cross-section of the membrane has an even mass distribution. For example, in the case where the shape of the membrane is a fiber having a round cross-section, the "central part" indicates a point where the distances from the fiber surface are the same in a cross-section of the fiber perpendicular to the fiber axis.

With respect to the average diameter of pores in the co-continuous porous structure of the core layer of the carbon membrane for fluid separation of the present invention, too small values thereof result in an increase in pressure loss and hence a decrease in fluid permeability. Consequently, the average diameter thereof is more preferably 30 nm or larger, even more preferably 50 nm or larger. Meanwhile, in case where the average diameter of the pores is too large, the effect in which the carbon branches support one another to maintain the whole structure is reduced, resulting in a decrease in pressure resistance. Consequently, the average diameter thereof is preferably 3,000 nm or less, more preferably 2,500 nm or less.

Here, as values of the average diameter of the pores, use is made of values obtained through a pore diameter distribution measurement by the mercury intrusion method. In the mercury intrusion method, mercury is infiltrated into pores of the co-continuous porous structure by pressure application, and the volume of the pores and the specific surface area are determined from the pressure and the amount of the mercury intruded. On the assumption that the pores are cylindrical, pore diameters is calculated from the relationship between the pore volume and the specific surface area. By the mercury intrusion method, a pore diameter distribution curves in the range of 5 nm to 500 µm can be acquired.

Incidentally, since the skin layer, which will be described later, has substantially no pores, the average diameter of the pores in the whole carbon membrane is substantially the same as the average diameter of the pores in the core layer.

The skin layer is a layer which is formed around the core layer and has substantially no co-continuous porous structure. The expression "has substantially no co-continuous porous structure" means that when a section formed by the cross section polisher method (CP method) is observed at a magnification resulting in 1±0.1 (nm/pixel), then a portion in which any pores have a size less than the resolution and hence no distinct pores are observed is present over an area that is not less than the region of a square in which each side corresponds to three times the structural period L calculated from X-ray analysis as described above.

The thickness of the skin layer is not particularly limited, and it may be suitably selected. However, when the skin layer is too thick, a membrane having such a skin layer tends to decrease in fluid permeability. Consequently, the thickness of the skin layer is preferably 10 µm or less, more preferably 5 µm or less, and even more preferably 1 µm or less.

Although, there is no particular lower limit thereon, the thickness of the skin layer is preferably 1 nm or larger and more preferably 100 nm or larger from the standpoint of making the skin layer maintain the shape of membrane and serving as a separation functional layer.

Due to the presence of the skin layer, which has substantially no co-continuous porous structure in the carbon membrane for fluid separation, the carbon membrane not only has the function of a separation layer for separating and purifying a mixed gas but also can enhance the pressure resistance.

The carbon membrane for fluid separation of the present invention may further include a coat layer outside the skin layer. Here, components forming the coat layer are not particularly limited, and various organic and inorganic polymer compounds can be used.

Figure 2:
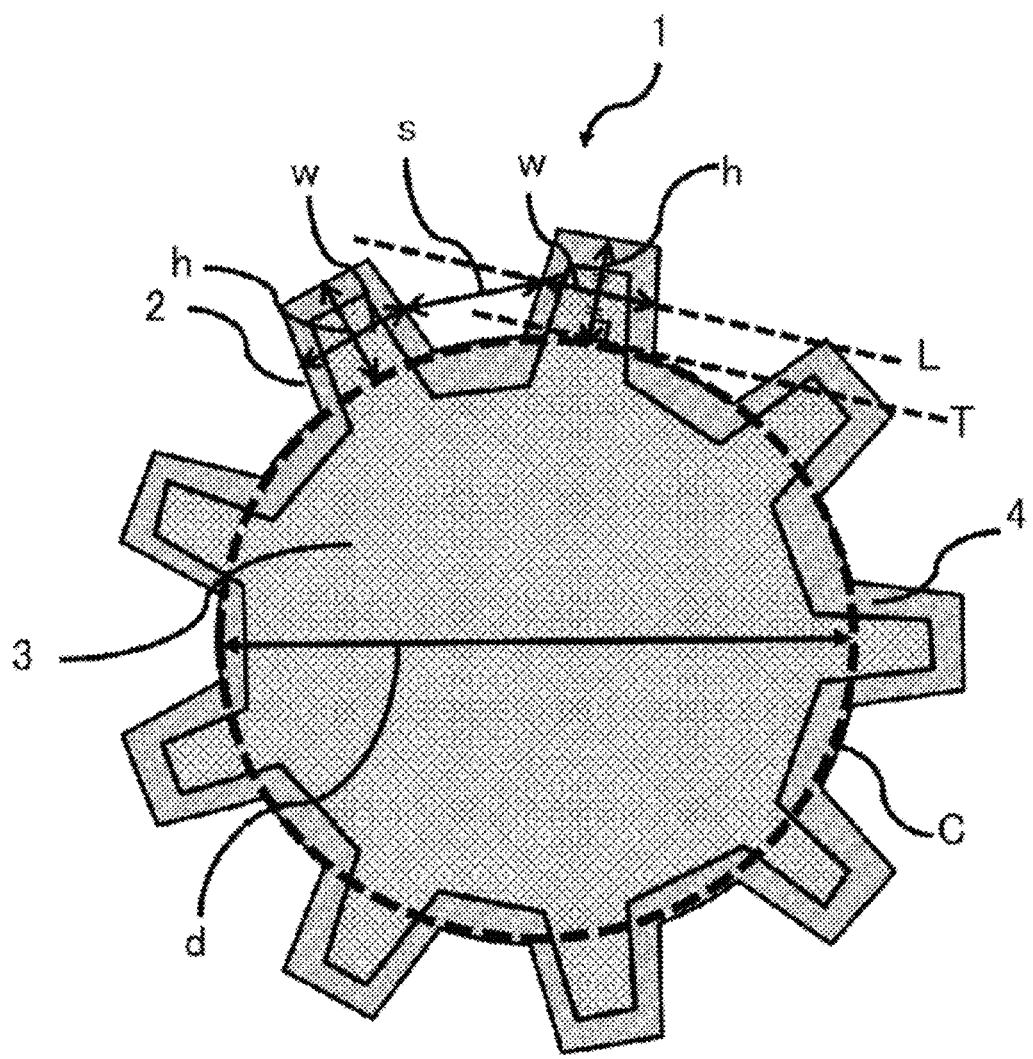
FIG. 2 is a schematic sectional view in an axial direction of the fiber in an embodiment of the carbon membrane for fluid separation of the present invention.

The carbon membrane for fluid separation of the present invention comprises projections which have a height difference of 1 μm or more and are formed on the surface of fiber. For convenience of explanation, a typical embodiment of the present invention will be described with reference to the signs and reference numerals in FIG. 2. However, the present invention is not limited to the embodiment of FIG. 2 at all.

The projection having a height difference of 1 μm or more means that when a cross-section which includes the projections and is perpendicular to the axial direction of the fiber is examined, a length h of a perpendicular line drawn from the top point of the projection toward an inscribed circle C which inscribes in an outer edge of the carbon membrane is at least 1 μm.

Since the projections having a height difference of at least 1 μm are provided in the carbon membrane, decrease in separation performance caused by adherence of the carbon membranes when the carbon membranes are made into a module is prevented, and the water repellency in the surface of the carbon membrane is improved and hence water vapor in the mixed gases is prevented from staying thereon.

When the height of the projections is too large relative to the radius of the inscribed circle which inscribes in the outer edge of the carbon membrane, there are risks that the projections may be crushed or chipped during the manufacturing of the carbon membrane or the carbon membrane module for fluid separation using the carbon membrane. It is therefore preferred that the height of the projections is ½ or less of the radius of the inscribed circle which inscribes in the outer edge of the cross-section of the fiber. When the inscribed circle which inscribes in the outer edge of the cross-section of the fiber is elliptical, the radius means a major axis radius thereof.

In order to obtain a sufficient effect of preventing the adherence of the membranes, and in order to express sufficient water repellency to prevent the skin layer from clogging with liquid water, it is preferred that the projection is a ridge-like protrusion which extends 100 μm or more in length in the axial direction of the fiber.

Further, the longer the projection extends in the axial direction of the fiber, the higher the effect of preventing the adherence of the membranes and the water repellency are enhanced. It is therefore more preferred that the ridge-like protrusion extends along the whole length of the carbon membrane for fluid separation. Though the number of such ridge-like protrusions is not particularly limited, it is preferred that a plurality of ridge-like protrusions are formed.

According to a particularly preferred form, a plurality of ridge-like protrusions are formed radially in the cross-section of the fiber in the carbon member for fluid separation. In this case, from the standpoint of the effect of preventing the adherence of the membranes and the expression of the water repellency, the average formation interval of the ridge-like protrusions is preferably ⅓ or more and 4 times or less, more preferably ½ or more and 2 times or less, of the average width of the ridge-like protrusions.

In the present specification, the width of each ridge-like protrusion is defined as follows. In the cross-section of the carbon membrane, a perpendicular line is drawn from the top point of the projection toward the inscribed circle which inscribes in the outer edge of the carbon membrane. A tangent T of the inscribe circle passes through an intersection of the inscribe circle and the perpendicular line. A straight line L is drawn in parallel with the tangent T and passes through a middle point of the perpendicular line. The straight line L has two intersections with the outer edge of the cross-section of the fiber (the outer edge of the projection). The width of the ridge-like protrusion is defined as a distance w between the two intersections (the intersections will be referred to as "halfway points of the ridge-like protrusions"). Incidentally, as the inscribed circle which inscribes in the outer edge of the carbon membrane, a complete round or an ellipse is selected in accordance with the shape of the outer edge.

Regarding each formation interval with which the ridge-like protrusions are formed, a line segment connecting the halfway points of adjacent ones of the ridge-like protrusions is defined as a length s. Regarding the average height, the average width and the average formation interval, height, width and formation interval are measured for all of the ridge-like protrusions in a cross-section and averaged.

Though the average width of the ridge-like protrusions is not particularly limited, when the average width is too narrow, the projections are crushed when the membranes are made into a module or when gas is introduced. Therefore, the average width is preferably 1 μm or more, and more preferably 5 μm or more. Meanwhile, when the average width is too wide, the number of projections that can be formed on a cross-section is reduced and hence the effect of preventing the adherence between membranes and the water repellency are reduced. Therefore, the average width is preferably 100 μm or less, and more preferably 50 μm or less.

The carbon membrane in which a plurality of ridge-like protrusions having different widths are formed on the surface of the fiber is preferred, because it further enhances the effect of preventing adherence between the membranes and the water repellency. It is preferred that the carbon membrane has ridge-like protrusions with two or more kinds of widths, and more preferably three or more kinds of widths, on the surface of the fiber.

The diameter (in the case of a complete round) or the major axis (in the case of an ellipse) (hereinafter referred to as "diameter d of the carbon membrane" in the present specification) of the inscribed circle which inscribes in the outer edge of the carbon membrane is not particularly limited. From the standpoint of keeping handleability in formation into a module, it is preferably 10 μm or more. In addition, from the standpoint of improvement in the bending rigidity and improvement in the membrane area per unit volume in the module, it is preferably 500 μm or less.

The length of the fiber can be desirably determined. From the standpoint of improvement in handleability in formation into a module or improvement in the gas permeation performance, it is preferably 10 mm or more.

Further, as the carbon membrane for fluid separation of the present invention, it is preferred that not only the skin layer but also the core layer are formed in each of the projections. In conventional carbon membranes, the projections formed therein often became defective due to their brittleness when the carbon membranes are made into a module. However, the strength of each projection is enhanced due to the presence of the core layer in the projections and hence occurrence of defects can be reduced.

It is therefore preferred that the presence ratio of the core layer within the projection is high. As an index indicating the presence ratio of the core layer within the projection, a core layer ratio in the projection cross-section is defined by the following equation.

Core layer ratio in projection cross-section (%)=$Sc/Sa \times 100$

Here, Sa designates the cross-sectional area of the projection of interest, and Sc designates the area of the core layer in the cross-section of the projection of interest. As for the core layer ratio in the projection cross-section, the higher, the better, from the standpoint of the strength of the projection. However, when the core layer ratio in the projection cross-section is too high, the projection cannot be completely covered with the skin layer, the probability of defect increases.

It is therefore preferred that the core layer ratio in the projection cross-section is 50% or more and 98% or less. Here, assume that the core layer ratios in the projection cross-section of three or more projections are measured when six or more projections are present, and the core layer ratios in the projection cross-section of two or more projections are measured when three or more and five or less projections are present. Then, the measured ratios are arithmetically averaged.

Figure 3:
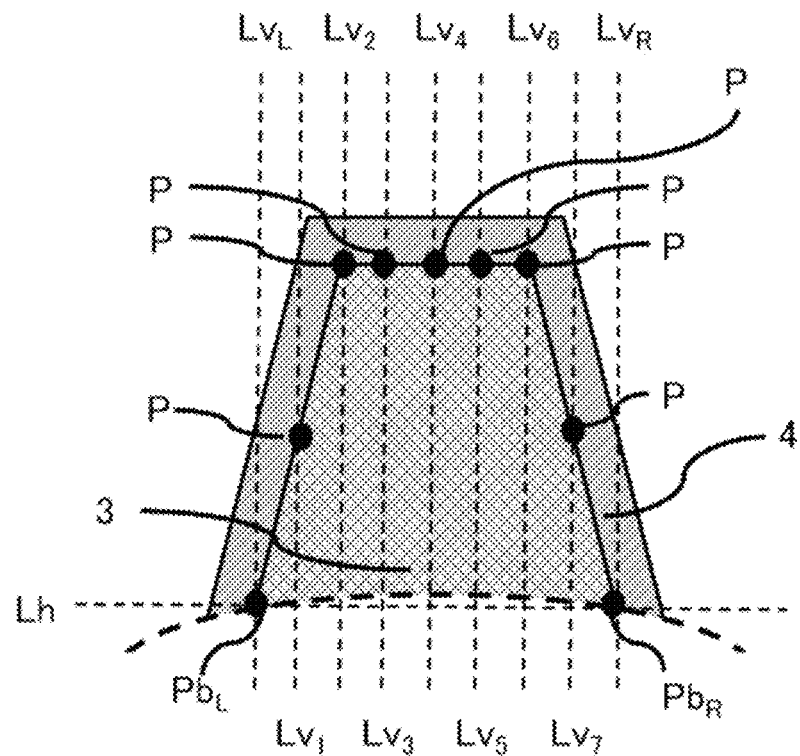
FIG. 3 is a schematic sectional view of a projection in the axial direction of the fiber in the embodiment of the carbon membrane for fluid separation of the present invention.

For convenience of explanation, a typical embodiment of the present invention will be described with reference to the signs and reference numerals in FIG. 3. However, the present invention is not limited to the embodiment of FIG. 3 at all.

The Sa and the Sc are calculated by observing a cross-section of a projection formed precisely by a cross section polisher method (CP method) and performing image analysis thereon.

Upon an image observed at a magnification with which entirety of the cross-section of the projection of interest can be contained in the image, an arc expressing an inscribed circle serving as an outer edge of the carbon membrane is fitted and the area formed by the arc and the outer circumferential portion of the projection is regarded as Sa.

Upon the image observed at the magnification with which entirety of the cross-section of the projection of interest can be contained in the image, the area of a polygon obtained by connecting boundary points between the core layer and the skin layer is regarded as Sc.

The calculation accuracy of Sc depends on the number of the boundary points. It is therefore preferred to define as many boundary points as possible. Further, it is preferred that the boundary points are defined to be distributed all over the section of the projection as evenly as possible.

A preferred method for evenly defining the boundary points will be described.

Left and right boundary points $Pb_L$ and $Pb_R$ on the arc which was defined as the surface of the fiber are determined. A straight line Lh connecting the boundary points $Pb_L$ and $Pb_R$ is drawn, and straight lines perpendicular to the straight line Lh and passing through the boundary points $Pb_L$ and $Pb_R$ are set as $Lv_L$ and $Lv_R$ respectively. Further, a region sandwiched between the straight line $Lv_L$ and the straight line $Lv_R$ is equally divided into n parts by straight lines parallel to the straight line $Lv_L$ or the straight line $Lv_R$, and boundary points P on the parallel straight lines ($Lv_1$ to $Lv_7$ in FIG. 3) are determined. It is preferred that n is as large as possible to enhance the calculation accuracy of Sc. Specifically, n is preferably 5 or more, and more preferably 8 or more.

In addition, in the carbon membrane for fluid separation of the present invention, it is preferred that the nitrogen element ratio in the surface of the fiber is an element ratio of 0.1 to 30%. The element ratio herein designates a value measured by an XPS analysis apparatus.

The higher the nitrogen element ratio is, the higher the affinity between carbon dioxide and the carbon membrane is likely, particularly as a carbon dioxide separation membrane. Thus, the permeability of carbon dioxide is improved.

In addition, the lower the nitrogen element ratio is, the more excellent the durability is as the carbon membrane when it is exposed to a high temperature environment, and the more the effect of water repellency as the carbon membrane is enhanced.

From these standpoints, the nitrogen element ratio is more preferably 1 to 25%, and even more preferably 3 to 18%.

<Method for Producing the Carbon Membrane for Fluid Separation>

The carbon membrane for fluid separation of the present invention can be produced by a production method including a step in which a carbonizable resin and an eliminable resin are brought into a compatibly mixed state to obtain a resin mixture (step 1), a step in which the resin mixture in the compatibly mixed state is spun to form a phase-separated microstructure (step 2), and a step in which a precursor obtained thus is carbonized by pyrolysis (step 3).

[Step 1]

Step 1 is a step in which 10 to 90 weight % of the carbonizable resin and 90 to 10 weight % of the eliminable resin are brought into a compatibly mixed state to obtain a resin mixture.

Here, the carbonizable resin is a resin which carbonizes by pyrolysis and remains as branches (carbon parts). Both a thermoplastic resin and a thermosetting resin can be used.

In the case of a thermoplastic resin, it is preferred to select a resin which can be rendered infusible by a simple and easy process such as heating or irradiation with high energy rays. In the case of a thermosetting resin, there are many cases where a treatment for imparting infusibility is unnecessary, and thermosetting resins also are included in suitable materials.

Examples of such thermoplastic resins include polyphenylene oxide, polyvinyl alcohol, polyacrylonitrile, phenolic resins, and fully aromatic polyesters. Examples of such thermosetting resins include unsaturated polyester resins, alkyd resins, melamine resins, urea resins, polyimide resins, diallyl phthalate resins, lignin resins, urethane resins.

These resins may be used either alone, or a mixture of them. However, from the standpoint of ease of mold processing, it is also preferred to mix thermoplastic resins or mix thermosetting resins.

It is preferred to use thermoplastic resins among those from the standpoints of carbonization yield, moldability, and profitability. It is more preferred to use polyphenylene oxide, polyvinyl alcohol, polyacrylonitrile, or a fully aromatic polyester.

The eliminable resin is a resin which can be removed subsequent to step 2, which will be described later, in any of the following stages: simultaneously with a treatment for imparting infusibility; after the treatment for imparting infusibility; and simultaneously with the pyrolysis.

Methods for removing the eliminable resin are not particularly limited, and it is preferred to use methods such as the following: a method in which the eliminable resin is chemically removed, for example, by conducting depolymerization using a chemical; a method in which the eliminable resin is dissolved away by adding a solvent capable of dissolving the eliminable resin; and a method in which the resin mixture is heated to lower the molecular weight of the eliminable resin by thermal decomposition, thereby removing the eliminable resin. These techniques can be used alone or in combination thereof. In the case of using a combination, the techniques may be simultaneously performed or separately performed.

As the method in which the eliminable resin is chemically removed, a method in which the resin is hydrolyzed using acid or alkali is preferred from the standpoint of profitability and handleability. Examples of resins which are susceptible to hydrolysis by acid or alkali may include polyesters, polycarbonates, polyamides.

Preferred examples of the method in which the eliminable resin is removed by adding a solvent capable of dissolving the eliminable resin include a method in which the solvent is continuously supplied to the carbonizable resin and the eliminable resin which have been mixed, thereby dissolving and removing the eliminable resin; and a method in which the solvent and the resins are mixed batchwise to dissolve and remove the eliminable resin.

Specific examples of eliminable resin suitable for the method of removing by solvent addition include polyolefins such as polyethylene, polypropylene or polystyrene, acrylic resins, methacrylic resins, polyvinyl pyrrolidone, aliphatic polyesters and polycarbonates. Of these, amorphous resins are preferred from the standpoint of solubility in the solvent, and examples thereof include polystyrene, methacrylic resins, and polycarbonates.

Examples of the method in which the eliminable resin is lowered in molecular weight by thermal decomposition and removed thereby include: a method in which the carbonizable resin and eliminable resin that have been mixed are heated batchwise to decompose the eliminable resin; and a method in which the carbonizable resin and eliminable resin that have been continuously mixed are continuously supplied to a heating source and heated to thereby decompose the eliminable resin.

It is preferred that the eliminable resin is, among those resins, a resin that disappears in step 3, which will be described later, through thermal decomposition when the carbonizable resin is carbonized by pyrolysis. It is preferred that the eliminable resin is a thermoplastic resin that does not undergo a large chemical change when the carbonizable resin is subjected to the treatment for imparting infusibility, which will be described later, and that, through pyrolysis, gives a carbonization yield of less than 10%.

Specific examples of such eliminable resins include polyolefins such as polyethylene, polypropylene or polystyrene, acrylic resins, methacrylic resins, polyacetals, polyvinyl pyrrolidone, aliphatic polyesters, aromatic polyesters, aliphatic polyamides and polycarbonates. Each of these resins may be used alone, or in a mixed state.

In step 1, the carbonizable resin and the eliminable resin are brought into a compatibly mixed state to obtain a resin mixture (polymer alloy). The expression "brought into a compatibly mixed state" herein means that by suitably selecting conditions regarding temperature and/or solvent, a state that no structure in which the carbonizable resin and the eliminable resin are present as separate phases is observed with an optical microscope, is produced.

The carbonizable resin and the eliminable resin may be brought into a compatibly mixed state by mixing the resins alone with each other, or by further adding solvent thereto.

Examples of a system in which a plurality of resins have been brought into a compatibly mixed state include a system which shows a phase diagram of the upper-limit critical solution temperature (UCST) type in which the resins are in a phase-separated state at low temperatures but form a single phase at high temperatures, and a system which conversely shows a phase diagram of the lower-limit critical solution temperature (LCST) type in which the resins are in a phase-separated state at high temperatures but form a single phase at low temperatures. Furthermore, especially in the case of a system in which at least one of the carbonizable resin and the eliminable resin has been dissolved in a solvent, preferred examples include one in which the phase separation, which will be described later, is induced by the infiltration of a nonsolvent.

The solvent to be added is not particularly limited. Preferred is such a solvent that the absolute value of the difference between the solubility parameter (SP value) thereof and the average of the SP values of the carbonizable resin and eliminable resin is 5.0 or less, the absolute value being an index to dissolving properties.

It is known that the smaller the absolute value of the difference from the average of the SP values, the higher the dissolving properties. Therefore, it is preferred that there is no difference. Meanwhile, the larger the absolute value of the difference from the average of the SP values, the lower the dissolving properties and the more the compatibly mixed state of the carbonizable resin and eliminable resin is difficult to attain.

In view of this, the absolute value of the difference from the average value of the SP values is preferably 3.0 or less, and most preferably 2.0 or less.

Specific examples of combinations of the carbonizable resin and the eliminable resin to be brought into a compatibly mixed state, in the case where the system contains no solvent, include polyphenylene oxide/polystyrene, polyphenylene oxide/styrene-acrylonitrile copolymer, fully aromatic polyester/polyethylene terephthalate, fully aromatic polyester/polyethylene naphthalate, fully aromatic polyester/polycarbonate. Specific examples of combinations, in the case where the system contains a solvent, include polyacrylonitrile/polyvinyl alcohol, polyacrylonitrile/polyvinyl phenol, polyacrylonitrile/polyvinyl pyrrolidone, polyacrylonitrile/polylactic acid, polyvinyl alcohol/vinyl acetate-vinyl alcohol copolymer, polyvinyl alcohol/polyethylene glycol, polyvinyl alcohol/polypropylene glycol, polyvinyl alcohol/starch.

Methods for mixing the carbonizable resin with the eliminable resin are not limited, and various known mixing methods may be used as long as even mixing is possible therewith. Examples thereof include a rotary mixer having stirring blades and a kneading extruder with screws.

It is preferred that the temperature (mixing temperature) at which the carbonizable resin and the eliminable resin are mixed together is not lower than a temperature at which both the carbonizable resin and the eliminable resin soften. As the temperature at which the resins soften, either the melting point of the carbonizable resin or eliminable resin in the case where the resin is a crystalline polymer or the glass transition temperature thereof in the case where the resin is an amorphous resin may be suitably selected.

By setting the mixing temperature at a temperature not lower than the temperature at which both the carbonizable resin and the eliminable resin soften, the viscosity of the two resins can be lowered and, hence, more efficient stirring and mixing are possible. There is no particular upper limit on the mixing temperature, but the temperature is preferably 400° C. or lower from the standpoint of preventing resin deterioration due to thermal degradation, thereby obtaining a carbon membrane precursor having excellent quality.

In step 1, 90 to 10 weight % of the eliminable resin is mixed to 10 to 90 weight % of the carbonizable resin. In cases when the proportions of the carbonizable resin and eliminable resin are within those ranges, an optimal pore size and an optimal porosity can be arbitrarily designed. Those proportion ranges are hence preferred.

So long as the proportion of the carbonizable resin is 10 weight % or larger, not only it is possible to give a carbonized membrane which retains mechanical strength but also an improved yield results; such proportions are hence preferred. Meanwhile, so long as the proportion of the carbonizable material is 90 weight % or less, the eliminable resin can efficiently form voids; such proportions are hence preferred.

A mixing ratio between the carbonizable resin and the eliminable resin can be arbitrarily selected within the range while taking account of the compatibility of each material. Specifically, since compatibility between resins generally becomes worse as the ratio therebetween approaches 1:1, preferred embodiments in the case where a system having not so high compatibility has been selected as starting materials include one in which the compatibility is improved by making the mixture approach to a so-called partial composition by increasing or reducing the amount of the carbonizable resin.

It is also preferred to add a solvent when the carbonizable resin and the eliminable resin are mixed with each other. The addition of a solvent not only lowers the viscosity of the carbonizable resin and eliminable resin to facilitate molding but also renders the carbonizable resin and the eliminable resin easy to bring into a compatibly mixed state. The solvent here is not particularly limited, and any solvent which is liquid at ordinary temperature and in which at least one of the carbonizable resin and the eliminable resin is soluble or swellable may be used. A solvent in which both the carbonizable resin and the eliminable resin dissolve is more preferred because the compatibility between both resins can be improved.

It is preferred that the amount of the solvent to be added is 20 weight % or more based on the total weight of the carbonizable resin and the eliminable resin from the standpoint of improving the compatibility between the carbonizable resin and the eliminable resin and lowering the viscosities thereof to improve the flowability thereof. Meanwhile, from the standpoint of the cost of the recovery and recycling of the solvent, the addition amount thereof is preferably 90 weight % or less based on the total weight of the carbonizable resin and the eliminable resin.

[Step 2]

Step 2 is a step in which the resin mixture that has been brought into a compatibly mixed state in Step 1 is spun to form a phase-separated microstructure.

Methods for spinning the resin mixture that has been brought into a compatibly mixed state is not particularly limited, and spinning methods may be selected suitably in accordance with a phase separation method which will be described later. When the resin mixture is a combination of thermoplastic resins, the resin mixture may be heated to at least the softening temperature of the resins and melt spinning can be performed thereafter. When the resin mixture contains a solvent, dry spinning, dry-wet spinning, wet spinning and so on may be selected suitably as solution spinning.

The melt spinning is a method in which the resin mixture which was heated and melted (flowable state) is extruded from a spinneret by use of a kneading extruder or the like, and wound while being cooled, so as to be formed into fiber. The process speed of the melt spinning is higher than that of the solution spinning, which will be described later. Thus, the melt spinning is excellent in productivity. In addition, volatilization of the solvent does not occur and hence expenses for safety measures during the process can be reduced. Therefore, the melt spinning is preferred because low cost manufacturing can be attained.

Meanwhile, the solution spinning is a method in which a spinning dope which consists of a resin mixture and a solvent and is prepared in advance is measured, and extruded from a spinneret, so as to be formed into a fiber. In this technique, the phase separated state can be controlled accurately. Particularly for dry-wet spinning or wet spinning using a coagulation bath, the phase separated state of precursor fiber can be controlled accurately by suitable combination of heat induction phase separation, nonsolvent induction phase separation, etc. Thus, the solution spinning is a more preferred technique.

Note that, when spinning is performed, a spinneret having a shape with irregularities in its outer edge, such as a multilobar type spinneret or a gear type spinneret, may be used, or a spinneret having a shape formed by the combination of one or more slit-shaped holes may be used. In this manner, a carbon membrane in which ridge-like protrusions extending in the axial direction of fiber are provided on the surface of the fiber can be formed.

A method by which the carbonizable resin and eliminable resin are caused to undergo phase separation are not particularly limited. Examples of such methods include a heat-induction phase separation method in which phase separation is induced by a temperature change; a nonsolvent-induction phase separation method in which phase separation is induced by adding a nonsolvent.

These phase separation methods may be used alone, or in combination thereof. Specific examples of methods in the case of using a combination include a method in which the mixture is passed through a coagulating bath to cause nonsolvent-induced phase separation and is then heated to cause heat-induced phase separation; a method in which nonsolvent-induced phase separation and heat-induced phase separation are simultaneously caused by controlling the temperature of a coagulating bath; and a method in which the material ejected from a spinneret is cooled to cause heat-induced phase separation and is then brought into contact with a nonsolvent.

Further, the extrudate is subsequently passed through a coagulating bath and then dried to thereby to form a microstructure. Thus, a precursor of the carbon membrane can be obtained. Here, coagulating liquid is not particularly limited. Examples of such coagulating liquid may include water, ethanol, saturated saline water, a mixed solvent composed of any of these and the solvent used in step 1.

(Removal of the Eliminable Resin)

It is preferred that the carbon membrane precursor obtained in step 2 is subjected to a treatment for removing the eliminable resin, before the precursor is subjected to the carbonization step (step 3) and/or simultaneously with the carbonization step.

Methods for the removal treatment are not particularly limited. Specific examples of such methods include a method in which the eliminable resin is chemically decomposed and lowered in molecular weight using an acid, alkali, or enzyme and is removed thereby; a method in which the eliminable resin is dissolved away with a solvent capable of dissolving the eliminable resin; a method in which the eliminable resin is decomposed and removed using radiation, such as electron beams, gamma rays, ultraviolet rays or infrared rays, or heat.

In particular, in the case where the eliminable resin can be removed through thermal decomposition, use can be made of: a method in which a heat treatment is performed beforehand at a temperature at which 80 weight % or more of the eliminable resin disappears; or a method in which the eliminable resin is gasified by thermal decomposition and removed in the carbonization step (step 3) or in the treatment for imparting infusibility which will be described below.

The method in which the eliminable resin is gasified by thermal decomposition and removed simultaneously with a heat treatment in the carbonization step (step 3) or in the treatment for imparting infusibility which will be described below is preferred because the production efficiency is heightened.

(Treatment for Imparting Infusibility)

It is preferred that the precursor of the carbon membrane obtained in step 2 is subjected to a treatment for imparting infusibility before it is subjected to the carbonization step (step 3).

Methods for the treatment for imparting infusibility are not particularly limited, and known methods can be used. Specific examples of the methods include: a method in which the precursor is heated in the presence of oxygen to thereby cause oxidative crosslinking; a method in which the precursor is irradiated with high-energy rays such as electron beams or gamma rays to form a crosslinked structure; and a method in which a substance having reactive groups is immersed or mixed to form a crosslinked structure. Of these, the method in which the precursor is heated in the presence of oxygen to thereby cause oxidative crosslinking is preferred because the process is simple and the production cost can be reduced. These techniques can be used alone or in combination thereof, and the techniques may be used either simultaneously or separately.

The heating temperature in the method in which the precursor is heated in the presence of oxygen to thereby cause oxidative crosslinking is preferably 150° C. or more from the standpoint of causing the crosslinking reaction to proceed efficiently, but is preferably 350° C. or less from the standpoint of preventing the yield from being impaired by a weight loss due to the thermal degradation, combustion, etc. of the carbonizable resin.

The oxygen concentration during the treatment is not particularly limited. However, it is preferred to supply a gas having an oxygen concentration of 18% or more is supplied because use of such gas makes it possible to reduce the production cost. Methods for supplying the gas is not particularly limited, and examples of such methods include a method in which the air is supplied as is into a heating device; a method in which pure oxygen is supplied into the heating device using a cylinder or the like.

Examples of the method in which the precursor is irradiated with high-energy rays such as electron beams or gamma rays to form a crosslinked structure include a method in which a commercial device such as an electron beam generator or gamma ray generator is used to irradiate the carbonizable resin with electron beams or gamma rays to thereby induce crosslinking. A lower limit of the irradiation intensity is preferably 1 kGy or higher from the standpoint of efficiently introducing a crosslinked structure by the irradiation, and the irradiation intensity is preferably 1,000 kGy or less from the standpoint of preventing the membrane strength from being reduced by a decrease in molecular weight due to cleavage of the main chain.

Examples of the method in which a substance having a reactive group is immersed or mixed to form a crosslinked structure include a method in which a low-molecular-weight compound having a reactive group is immersed into the precursor of the carbon membrane, and heated or irradiated with high energy rays to cause a crosslinking reaction to proceed; and a method in which a low-molecular-weight compound having a reactive group is mixed beforehand, and heated or irradiated with high energy rays to cause a crosslinking reaction to proceed.

[Step 3]

Step 3 is a step in which either the precursor of the carbon membrane obtained in step 2, or the precursor which, according to need, has undergone the removal of the eliminable resin and/or the treatment for imparting infusibility, is pyrolyzed and carbonized to obtain a carbon membrane.

In order to sufficiently carbonize the precursor of the carbon membrane sufficiently, it is preferred that the pyrolysis is conducted by heating to 400° C. or higher in an inert gas atmosphere. Here, the inert gas is a gas which is chemically inactive during the heating.

Specific examples thereof include helium, neon, nitrogen, argon, krypton, xenon, carbon dioxide.

From the standpoint of inactivity and profitability, it is preferred to use nitrogen or argon among these. The upper limit of the heating temperature is not particularly limited, but the lower the heating temperature is, the more preferred and thus preferred. A rough standard of the heating temperature is 1,500° C.

The flow rate of the inert gas is not limited so long as the oxygen concentration in the atmosphere within the heating device can be sufficiently lowered, and it is preferred to suitably select an optimum value in accordance with the size of the heating device, the supplied amount of the precursor of the carbon membrane, the heating temperature, etc. Although there is no particular upper limit on the flow rate thereof, it is preferred to suitably set the flow rate in accordance with a temperature distribution or the design of the heating device, from the standpoint of profitability and of reducing temperature differences within the heating device.

As for the heating method in the case where the carbonization treatment is continuously performed, use may be made of a method in which the membrane is continuously fed to and taken out from the heating device kept at a constant temperature, using rollers, conveyor, or the like. This method is preferred because the production efficiency can be heightened.

Meanwhile, in the case where a batch treatment is conducted in a heating device, there is no particular lower limit on the heating rate and cooling rate. However, rates of 1° C./min or more are preferred because the time period required for the heating and cooling can be shortened therewith to thereby heighten the production efficiency. There is no particular upper limit on the heating rate and cooling rate. It is, however, preferred to employ a rate which is lower than the thermal shock resistance of the member that constitutes the heating device.

(Formation of Projections)

Methods for forming projections on the surface of the fiber are not particularly limited. As described above, the method in which spinning is performed using a multilobar type or gear type spinneret in step 2 is preferred. Alternatively, a method in which the fiber is partially dented by physical pressure such as embossing to form projections may be used in any step after the spinning in step 2 and before Step 3, and preferably before the pyrolysis in step 3.
<Carbon Membrane Module for Fluid Separation>

The carbon membrane module for fluid separation of the present invention includes a carbon membrane for fluid separation of the present invention, a potting resin, and a vessel.

The potting resin is a resin which is used for bundling and fixing a plurality of carbon membranes for fluid separation and/or fixing the carbon membrane for fluid separation of the present invention to the inner surface of the vessel.

Various thermosetting or thermoplastic resins can be used as the potting resin as long as they can close gaps among the carbon membranes for fluid separation and a gap between the carbon membrane for fluid separation of the present invention and the inner surface of the vessel.

Examples of such thermosetting resins include epoxy resins, polyurethane resins and silicone resins.

Examples of such thermoplastic resins may include polyether sulfones, polycarbonates, amorphous polyarylates, polyolefins, polyesters, polyamides, polyethers.

The vessel is a cylindrical casing member in which the carbon membranes for fluid separation are stored.

The cross-sectional shape of the vessel is not particularly limited, but it is preferred that the cross-sectional shape is elliptic or circular because the pressure resistance of the vessel can be enhanced. Particularly the circular cross-sectional shape is preferred. The raw material of the vessel is not particularly limited, and metals, resins, composite materials, etc. can be used.

EXAMPLES

Preferred examples of the present invention will be described below.
[Evaluation Procedure]
(Existence of Co-Continuous Porous Structure)

The fibrous carbon membrane was sufficiently cooled in liquid nitrogen and then cut with tweezers, and a core layer portion of the resultant cut surface was examined with a scanning electron microscope. In cases when a structure in which carbon-framework branches and pores (voids) had been respectively interconnected and had been regularly intertwined with each other three-dimensionally was observed, this carbon membrane was deemed to have a co-continuous porous structure.
(Measurement of Shape of Ridge-Like Protrusion in Cross-Section)

The carbon membrane was cooled in liquid nitrogen and then cut with tweezers, and the resultant cut surface was examined with a scanning electron microscope. An image was acquired at a desired magnification with which entire cross-section could be included in the image. Subsequently, an inscribed circle which was a complete round or an ellipse and inscribed in the outer edge of the carbon membrane was drawn using image processing software "ImageJ".

A perpendicular line was drawn from the top point of the ridge-like protrusion toward the inscribed circle and the length of the perpendicular line was taken as the height of the ridge-like protrusion. A tangent line of the inscribed circle passes through an intersection of the inscribe circle and the perpendicular line. A straight line is drawn in parallel with the tangent line and passes through a middle point of the perpendicular line. The straight line has two intersections with the outer edge of the cross-section of the fiber (the outer edge of the ridge-like protrusion). The distance between the two intersections (the intersections will be referred to as "halfway points of the ridge-like protrusions") is taken as the width of the ridge-like protrusion.

In addition, the length of a line segment connecting halfway points of ridge-like protrusions adjacent to each other was regarded as a formation interval between the ridge-like protrusions. As for all the ridge-like protrusions in the cross-section, the heights of the ridge-like protrusions, the widths of the ridge-like protrusions, and the formation intervals among the ridge-like protrusions were measured, and their average values were set as the average height, the average width and the average formation interval of the ridge-like protrusions, respectively.
(Average Porosity)

The carbon membrane was embedded in a resin, and a cross-section of the carbon membrane was then exposed with a razor blade or the like. Using the sputtering device SM-09010 manufactured by JEOL Ltd., argon ion beams were caused to strike on the specimen surface at an acceleration voltage of 5.5 kV to etch the surface.

A central part of the resultant cross-section of the carbon membrane was examined with scanning electron microscope S-5500, manufactured by Hitachi High-Technologies Corp., at such a magnification as to result in 1±0.1 (nm/pixel) and at a resolution of 700,000 pixels or higher, and a square region in the membrane cross-section which was necessary for calculation and in which each side thereof had 512 pixels was set on the image obtained through the microscopic examination. The cross-sectional area of the carbon membrane and the area of the pores were expressed by C and D, respectively, and the porosity was determined using the following equation. An average porosity was calculated by obtaining an arithmetic average of any 20 sites within the cross-section.

Average porosity (%)=$C/D \times 100$ (Structural Period)

A carbon membrane was sandwiched between specimen plates, and the position of a CuKα ray source and the positions of the specimen and a two-dimensional detector were regulated so that information on scattering angles less than 10 degrees was obtained from the X-ray source obtained from the CuKα ray source. From the image data (luminance information) obtained from the two-dimensional detector, the data on the central portion which had been affected by the beam stopper were excluded. Radius vectors from the beam center were set, and the values of luminance for the range of 360° at angular intervals of 1° were summed up to obtain a scattered-light-intensity distribution curve. From the scattering angle 2θ corresponding to the position of a peak in the curve obtained, the structural period of the interconnected-structure portion was obtained using the following equation.

$$L = \frac{\lambda}{2\sin\theta} \qquad \text{[Equation 2]}$$

L: structural period, λ: wavelength of incident X-rays (μm)

In the case where the structural period was 1 μm or more and no peak of X-ray scattering was observed, continuous rotation images were captured with an X-ray microscope at steps of 0.3° over a range of 180° or more to obtain a CT image. The CT image obtained was subjected to Fourier transformation, and the resultant two-dimensional spectrum was processed by circular averaging to obtain a one-dimensional spectrum. The characteristic wavelength corresponding to the position of a peak top in the one-dimensional spectrum was determined, and the structural period was obtained as the inverse of the wavelength.

(Core Layer Ratio in Projection Cross-Section)

The carbon membrane was embedded in a resin, and a cross-section of the carbon membrane was then exposed with a razor blade or the like. Using the sputtering device SM-09010 manufactured by JEOL Ltd., argon ion beams were caused to strike on the specimen surface at an acceleration voltage of 5.5 kV to etch the surface.

The resultant cross-section of the carbon membrane was examined with scanning electron microscope S-5500, manufactured by Hitachi High-Technologies Corp., and an image was acquired at such a magnification with which all the section of the projection of interest can be included in the image. From an image obtained thus, the areas required for calculation of the core layer ratio in each projection cross-section, that is, the cross-sectional area Sa of the projection of interest and the area Sc of the core layer in the cross-section of the projection of interest were calculated using the image processing software "ImageJ". Boundary points used here were defined on line segments by which the region sandwiched between the straight line $Lv_L$ and the straight line $Lv_R$ was evenly divided into eight parts.

(Ratio of Nitrogen Atoms)

A ratio of nitrogen atoms was measured using an XPS device (Quantera SXM (manufactured by PHI)) on the conditions that excited X-rays were monochromatic Al $K\alpha_{1,2}$ rays (1,486.6 eV), the X-ray diameter was 100 µm, and the photoelectron escape angle was 45° (inclination of a detector with respect to the specimen surface).

Obtained data was analyzed with smoothing: 9-point smoothing, and abscissa correction: C1s main peak at 284.6 eV. Thus, the ratio of nitrogen atoms relative to all the elements was calculated by atom %.

(Measurement of Gas Permeation Rate)

10 carbon membranes were bundled and housed in the vessel made of stainless steel. Ends of the bundled carbon membranes were fixed to the inner surface of the casing by an epoxy resin based potting resin, and both ends of the casing were sealed off. Thus, a carbon membrane module was manufactured, and a gas permeation rate was measured.

Carbon dioxide or methane containing a given concentration of water vapor was used as a gas to be measured. The carbon membrane module was set as an external pressure type module in which the gas to be measured was introduced into the fibrous gas separation membranes from the outside. The gas to be measured was made to flow into the external pressure type module, and the flow rate of carbon dioxide and the flow rate of methane per unit time were measured in an early stage and after the elapse of 24 hours.

Example 1

70 g of polyacrylonitrile (MW 150,000) manufactured by Polysciences, Inc., 70 g of polyvinyl pyrrolidone (MW 40,000) manufactured by Sigma-Aldrich Co. LLC, and 400 g of dimethyl sulfoxide (DMSO) manufactured by Wakenyaku Co., Ltd. as a solvent were put into a separable flask, so as to prepare a uniform and transparent solution at 150° C. while being stirred and refluxed for three hours. In this solution, the concentration of polyacrylonitrile and the concentration of polyvinyl pyrrolidone were 10 weight %, respectively.

Figure 4:
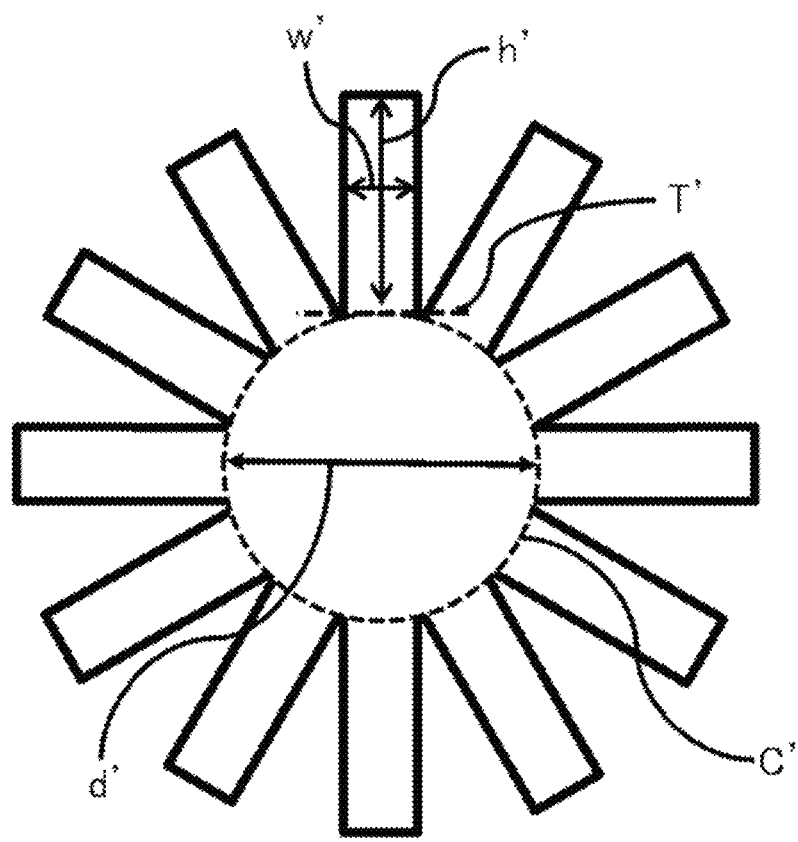
FIG. 4 is a schematic view of a multilobar type single-hole spinneret used in Examples 1 and 2.

The solution obtained thus was cooled down to 25° C., and then the solution was ejected at 3 mL/min from a multilobar type single-hole spinneret shown in FIG. 4, and introduced into a coagulation bath. The spinneret has 12 notches at equal intervals and around a circle whose diameter d' was 300 µm. Each notch had a height h' of 190 µm and a width w' of 80 µm. Thereafter, the solution was taken back at a rate of 5 m/min, and deposited on a tray. Thus, a raw fiber was obtained. Here, the height W and the width w' of each notch in the multilobar type single-hole spinneret can be considered to be defined in the same manner as the height h and the width w of each projection in the carbon membrane as described above. The obtained raw fiber was semitransparent, and phase separation had already occurred.

The obtained raw fiber was dried in a circulation type dryer to remove moisture from the surface of the raw fiber, and then subjected to vacuum drying. Thus, the dried raw fiber was obtained. Thereafter, the raw fiber was put into an electric furnace kept at 250° C., and heated in an oxygen atmosphere. Thus, a treatment for imparting infusibility was performed. The raw fiber subjected to the treatment for imparting infusibility turned black.

A carbonization treatment was performed on the infusibilized raw fiber obtained thus, in a nitrogen atmosphere and with an end-point temperature of 600° C. and a retention time of 5 minutes. Thus, a carbon membrane was produced.

In the obtained carbon membrane, the diameter of the inscribed circle in the outer edge was 260 µm. Further, the carbon membrane had 12 ridge-like protrusions. The projections (ridge-like protrusions) had an average height of 40 µm, an average width of 25 µm, and an average formation interval of 44 µm. A co-continuous porous structure as shown in FIG. 1 was formed in the core layer of the carbon membrane. The structural period of the co-continuous porous structure was 0.073 µm, and the average porosity was 55%.

In addition, from three projections, the core layer ratios in the projection cross-sections were obtained, and an average value thereof was 73%. The ratio of nitrogen atoms in the surface of the fiber in the obtained carbon membrane was measured as 12%.

In addition, as for the obtained carbon membrane, the permeation rate of carbon dioxide and the permeation rate of methane were measured in an atmosphere containing water vapor. A high permeation rate of carbon dioxide and a high separation factor of carbon dioxide/methane had been obtained stably within a measurable range since an early stage and until the lapse of 24 hours. Thus, excellent separation performance was exhibited.

Example 2

The polymer solution prepared in Example 1 was cooled down to 25° C. Thereafter, the solution was ejected at 3 mL/min from a multilobar type single-hole spinneret shown in FIG. 4, and introduced into a coagulation bath. The spinneret had 12 notches at equal intervals and around a circle whose diameter d' was 75 µm. Each notch had a height h' of 48 µm and a width w' of 20 µm. Thereafter, the solution was taken back at a rate of 5 m/min, and deposited on a tray. Thus, a raw fiber was obtained. Thereafter, drying and pyrolysis were performed in the same manner as in Example 1. Thus, a carbon membrane was obtained.

In the obtained carbon membrane, the diameter of the inscribed circle in the outer edge was 66 µm. Further, the carbon membrane had 12 ridge-like protrusions. The projections (ridge-like protrusions) had an average height of 11

μm, an average width of 6 μm, and an average formation interval of 11 μm. A co-continuous porous structure was formed in the core layer of the carbon membrane. The structural period of the co-continuous porous structure was 0.072 μm, and the average porosity was 53%. In addition, from three projections, the core layer ratios in the projection cross-sections were obtained, and an average value thereof was 10%.

In addition, as for the obtained carbon membrane, the permeation rate of carbon dioxide and the permeation rate of methane were measured in an atmosphere containing water vapor. A high permeation rate of carbon dioxide and a high separation factor of carbon dioxide/methane were obtained stably in an early stage of the measurement.

However, after the lapse of 24 hours, the flow rate per unit time was measured, and a very high permeation rate beyond the measurable range was recorded. Therefore, the separation factor of carbon dioxide/methane could not be measured. The carbon membrane housed in the casing was pulled out after the measurement, and the fiber surface was observed by an electron microscope. The projections had been cracked.

In Example 1, a high separation factor stably both in the early stage and after the lapse of 24 hours were exhibited. In Example 2, a high separation factor stably in the early stage was exhibited, but gas leakage occurred by cracking in the projections after the lapse of 24 hours.

In Example 2, it was suggested that the core layer ratio in each projection cross-section was much lower than that in Example 1, so that the projections were cracked when the carbon membranes contacted one another due to vibration or the like caused by the introduction of the gas to be measured.

Although the present invention has been described in detail and with reference to its specific embodiments, it is obvious for those skilled in the art that various changes or modifications can be made on the present invention without departing from the spirit and scope thereof. The present application is based on a Japanese patent application (Japanese Patent Application No. 2016-010451) filed on Jan. 22, 2016, the contents of which are incorporated herein by reference.

DESCRIPTION OF REFERENCE NUMERALS AND SIGNS 1 carbon membrane (fiber cross-section)
2 projection (ridge-like protrusion)
3 core layer
4 skin layer
C inscribed circle which inscribes in outer edge of fiber cross-section of carbon membrane
T tangent to inscribed circle which inscribes in outer edge of carbon membrane
L straight line passing through middle point of perpendicular line drawn from top point of projection toward inscribed circle which inscribes in outer edge of carbon membrane, and being in parallel with tangent T
C' inscribed circle which inscribes in outer edge of multilobar type spinneret
T' tangent to inscribed circle which inscribes in outer edge of multilobar type spinneret

The invention claimed is:

1. A carbon membrane for fluid separation which is a fibrous carbon membrane for fluid separation, comprising a core layer having a co-continuous porous structure, and a skin layer formed around the core layer and substantially having no co-continuous porous structure wherein projections having a height difference of 1 μm or more are formed on a surface of fiber.

2. The carbon membrane for fluid separation according to claim 1, wherein a core layer ratio in a projection cross-section of the projection is 50% or more and 98% or less.

3. The carbon membrane for fluid separation according to claim 1, which separates mixed gases.

4. The carbon membrane for fluid separation according to claim 1, wherein a height of the projection is ½ or less of a radius of an inscribed circle which inscribes in an outer edge of a cross-section of fiber.

5. The carbon membrane for fluid separation according to claim 1, wherein the projection is a protrusion extending 100 μm or more in length in an axial direction of the fiber.

6. The carbon membrane for fluid separation according to claim 5, wherein the protrusion extends along whole length of the carbon membrane for fluid separation.

7. The carbon membrane for fluid separation according to claim 5, wherein a plurality of the protrusions are formed on a surface of the fiber.

8. The carbon membrane for fluid separation according to claim 7, wherein the protrusions are formed radially in a cross-section of the fiber.

9. The carbon membrane for fluid separation according to claim 8, wherein an average formation interval of the protrusions is ⅓ or more and 4 times or less of an average a width of the protrusions.

10. The carbon membrane for fluid separation according to claim 5, wherein the average width of the protrusions is 1 μm or more and 100 μm or less.

11. A carbon membrane module for fluid separation, comprising the carbon membrane for fluid separation according to claim 1.

12. A carbon membrane for fluid separation which is a fibrous carbon membrane for fluid separation and which separates mixed gases, wherein projections having a height difference of 1 μm or more are formed on a surface of fiber.

13. The carbon membrane for fluid separation according to claim 12, which is a fibrous carbon membrane for fluid separation, comprising a core layer having a co-continuous porous structure, and a skin layer formed around the core layer and substantially having no co-continuous porous structure.

14. The carbon membrane for fluid separation according to claim 13, wherein a core layer ratio in a projection cross-section of the projection is 50% or more and 98% or less.

15. The carbon membrane for fluid separation according to claim 12, wherein a height of the projection is ½ or less of a radius of an inscribed circle which inscribes in an outer edge of a cross-section of fiber.

16. The carbon membrane for fluid separation according to claim 12, wherein the projection is a protrusion extending 100 μm or more in length in an axial direction of the fiber.

17. The carbon membrane for fluid separation according to claim 16, wherein the protrusion extends along whole length of the carbon membrane for fluid separation.

18. The carbon membrane for fluid separation according to claim 16, wherein a plurality of the protrusions are formed on a surface of the fiber.

19. The carbon membrane for fluid separation according to claim 18, wherein the protrusions are formed radially in a cross-section of the fiber.

20. The carbon membrane for fluid separation according to claim 19, wherein an average formation interval of the protrusions is ⅓ or more and 4 times or less of an average a width of the protrusions.

21. The carbon membrane for fluid separation according to claim 16, wherein the average width of the protrusions is 1 μm or more and 100 μm or less.

22. A carbon membrane module or fluid separation, comprising the carbon membrane for fluid separation according to claim 12.

* * * * *

UNITED STATES PATENT AND TRADEMARK OFFICE
CERTIFICATE OF CORRECTION

PATENT NO.        : 10,994,243 B2
APPLICATION NO.   : 16/071183
DATED             : May 4, 2021
INVENTOR(S)       : Masahiro Kitabata et al.

Page 1 of 1

It is certified that error appears in the above-identified patent and that said Letters Patent is hereby corrected as shown below:

In the Claims

Column 22, Line 29 At Claim 9, -- a width of the protrusions. -- should read -- width of the protrusions. --

Signed and Sealed this
Third Day of August, 2021

Drew Hirshfeld
*Performing the Functions and Duties of the
Under Secretary of Commerce for Intellectual Property and
Director of the United States Patent and Trademark Office*